Figure 1:
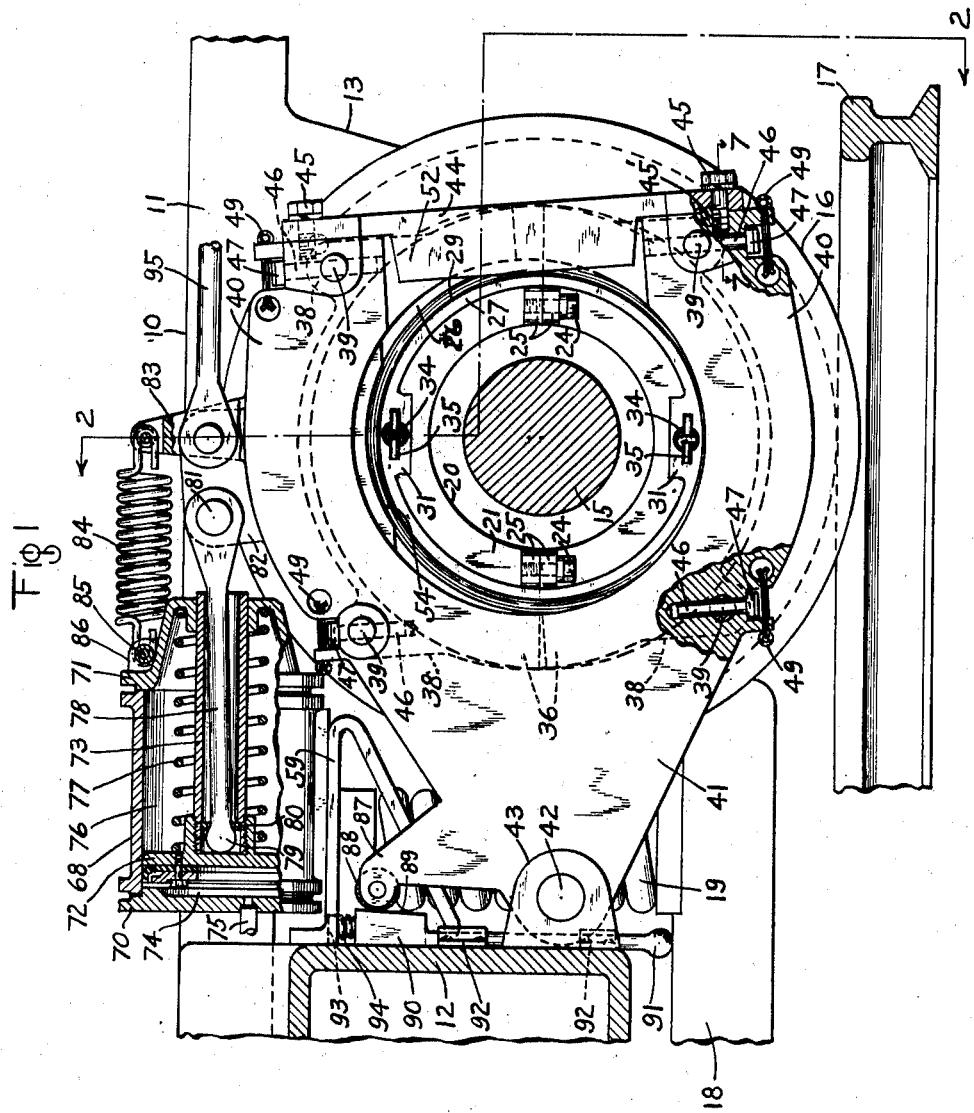

Sept. 26, 1939.　　　B. S. AIKMAN　　　2,174,406
BRAKE MECHANISM
Filed June 15, 1938　　　4 Sheets-Sheet 1

INVENTOR
BURTON S. AIKMAN
BY
ATTORNEY

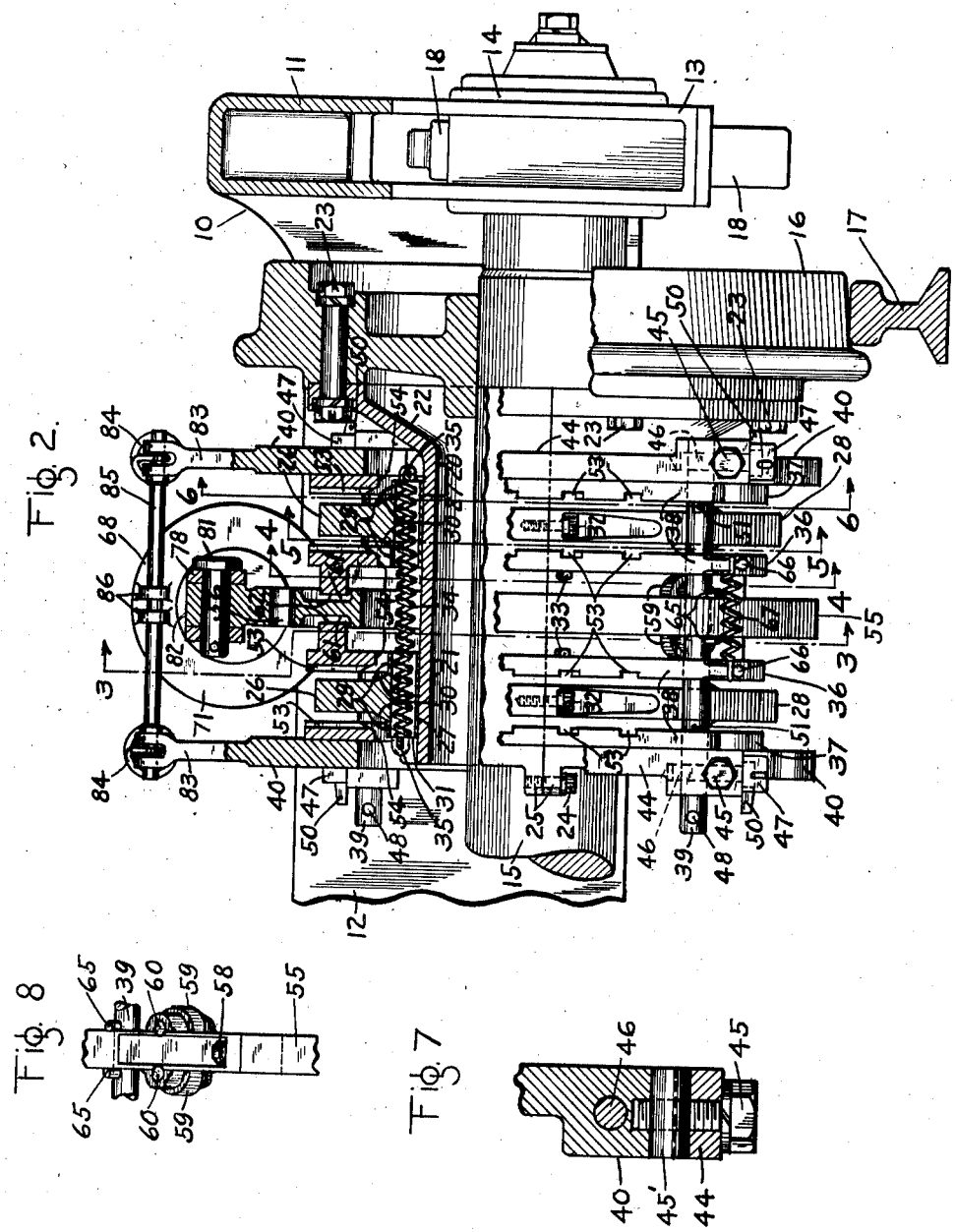

Sept. 26, 1939.  B. S. AIKMAN  2,174,406
BRAKE MECHANISM
Filed June 15, 1938  4 Sheets-Sheet 3
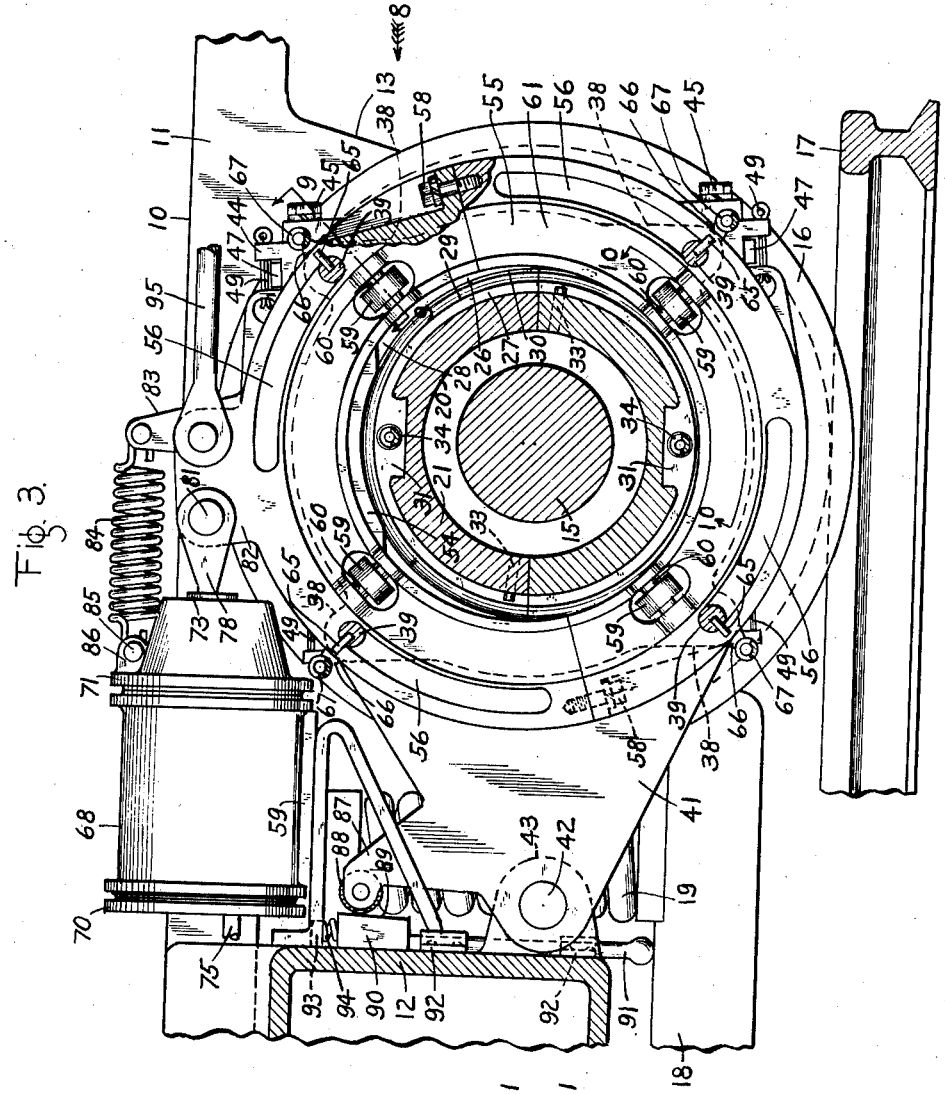
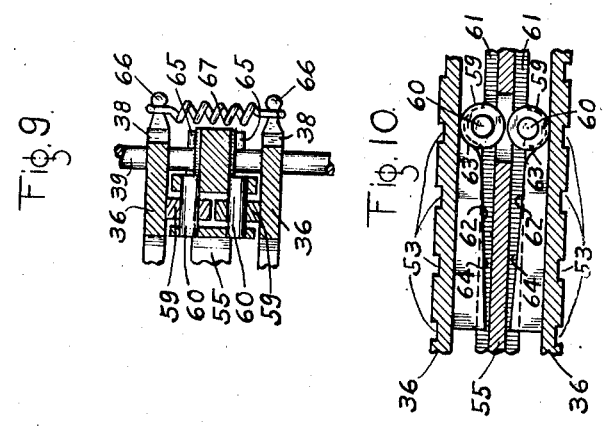
INVENTOR
BURTON S. AIKMAN
BY
ATTORNEY

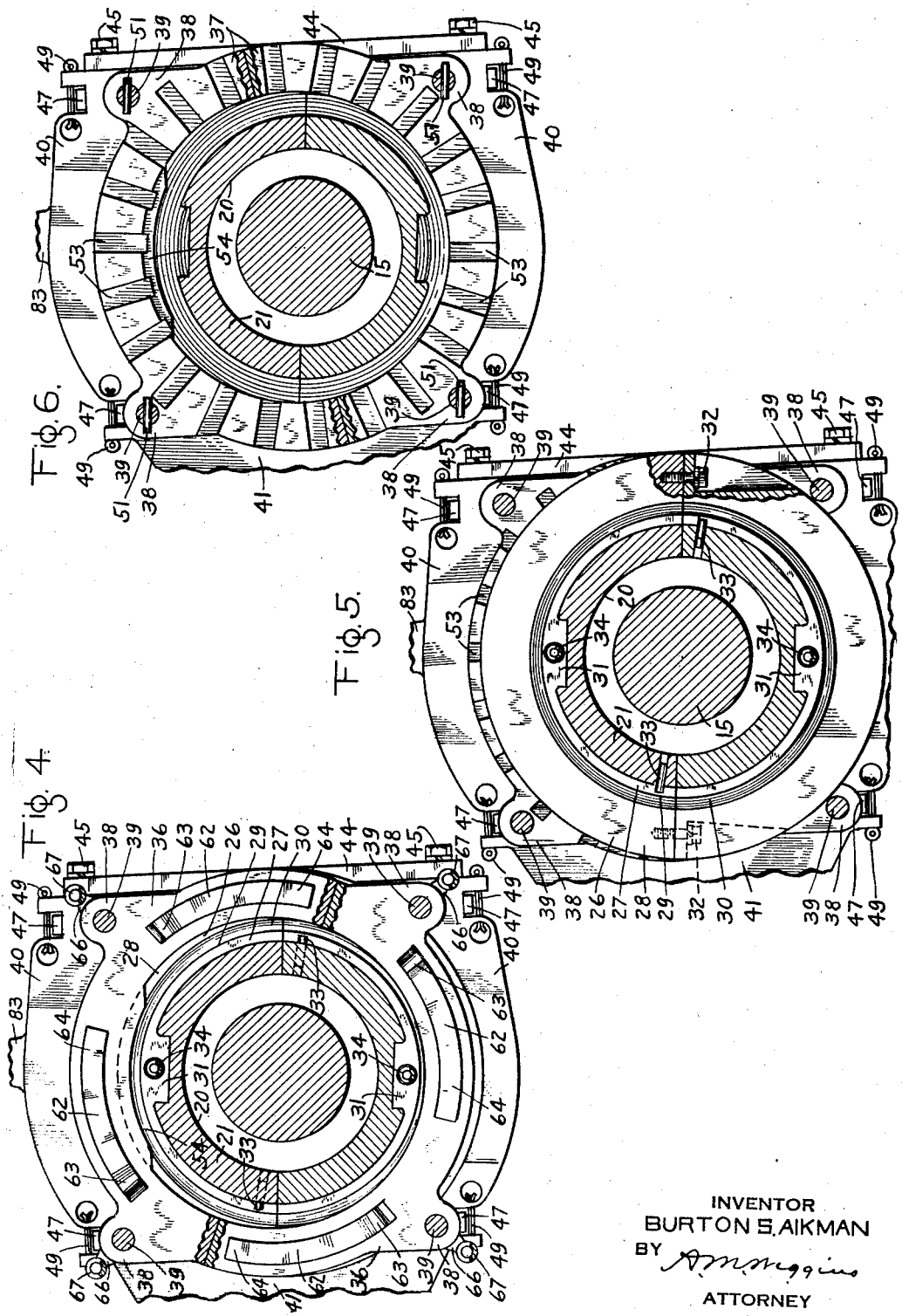

Patented Sept. 26, 1939

2,174,406

UNITED STATES PATENT OFFICE 2,174,406

BRAKE MECHANISM

Burton S. Aikman, Wilkinsburg, Pa., assignor to The Westinghouse Air Brake Company, Wilmerding, Pa., a corporation of Pennsylvania Application June 15, 1938, Serial No. 213,763

28 Claims. (Cl. 188—59)

This invention relates to brake mechanism and more particularly to the type embodying rotatable and non-rotatable friction braking elements adapted upon frictional interengagement to effect braking of a vehicle.

One object of the present invention is to provide an improved brake mechanism of the above type particularly adapted for use on railway vehicles and in which the major portion of the weight of the mechanism is carried by the vehicle truck which is spring supported from the vehicle wheels.

Another object of the invention is to provide an improved brake mechanism of the above type adapted to be controlled by a single brake cylinder device of substantially the same type as at present employed for controlling the brakes on railway vehicles.

According to the above objects, all parts of the improved mechanism except the rotatable braking elements and the means securing said elements to rotate with a vehicle wheel are carried by the vehicle truck frame and are thus spring supported from the vehicle wheels. This is considered desirable since the unsprung weight of the vehicle truck is not materially increased by the improved brake mechanism, as a result of which, the truck wheels and rails will not be subjected to any materially greater wear than heretofore due to the wheels encountering irregularities in the track rails, such as at rail joints, or the like.

Where the non-rotatable braking elements are carried by the truck frame however, they will move with said frame relative to the truck wheels and will therefore assume various positions eccentric to the rotatable braking elements secured to the wheels, due to different degrees of load carried by the truck frame or due to vibration of the truck on the track rails. It is however desired that the non-rotatable braking elements be in concentric relation with the rotatable braking elements at the time such elements are in frictional braking engagement.

Another object of the invention is therefore to provide improved means for moving the non-rotatable braking elements relative to the truck frame into concentric braking relation with the rotatable elements carried by the truck wheels at the time an application of the brakes is effected.

Another object of the invention is to provide an improved brake equipment of the above type in which the non-rotatable braking elements are centralized or moved into concentric relation with the rotatable braking elements before said elements are moved into frictional braking engagement.

Another object of the invention is to provide an improved brake equipment of the above type in which the centralizing of the non-rotatable braking elements with the rotatable braking elements and the braking operation thereof is controlled by a single brake cylinder device which is rigidly secured to the truck frame.

Another object of the invention is to provide an improved brake mechanism of the above type which is adapted to automatically limit the degree with which the brakes on a truck are applied in accordance with the degree of load in the vehicle carried by the truck.

A still further object of the invention is to provide an improved disc brake mechanism so arranged as to be capable of control by hand from the usual hand brake wheel or lever provided on railway vehicles.

A still further object of the invention is to provide an improved brake equipment of the above type which is relatively simple in construction, effective in braking the wheels of vehicles such as employed on railroads, and which can be readily associated with and disassociated from a wheel of such vehicles without removing the wheel or axle from a truck and by the use of ordinary tools commonly employed on railroads.

Other objects and advantages will be apparent from the following more detailed description of the invention.

In the accompanying drawings: Fig. 1 is a side elevational view, with certain parts in section, of the improved brake mechanism shown applied to a vehicle truck; Fig. 2 is a sectional view of the improved brake mechanism taken substantially on the line 2—2 in Fig. 1; Figs. 3 to 6 are sectional views of the improved brake mechanism taken substantially on the lines 3—3, 4—4, 5—5 and 6—6 in Fig. 2; Fig. 7 is a sectional view taken on the line 7—7 in Fig. 1; Fig. 8 is an edge view of a portion of a brake actuator taken in the direction of the arrow indicated by the reference character 8 in Fig. 3; and Figs. 9 and 10 are sectional views taken on the line 9—9 and 10—10 in Fig. 3.

Description of parts

As shown in the drawings, the improved brake mechanism is associated with a truck of the type employed under railway vehicles and which, for the purpose of illustration, may comprise a truck frame 10 having the usual spaced side members 11 connected together by transversely extending transoms 12 and end members (not shown).

Each of the side members 11 is provided with the usual depending spaced pedestals 13 between each pair of which is slidably mounted a journal box 14. An axle 15 of a wheel and axle assembly has its opposite ends journalled in the journal boxes 14 at one end of the truck, and secured to said axle in any desired manner and in the usual spaced relation are wheels 16 adapted to roll on rails 17.

An equalizer bar 18 is provided at each side of the truck with its opposite ends supported on the journal boxes 14. Each of the equalizer bars is provided for carrying springs 19 upon which the truck frame 10 is resiliently supported from the wheels 16 and is therefore capable of movement in a vertical direction relative to said wheels in the usual manner.

Only a portion of the elements of the truck frame above described are shown in the drawings, but since the construction of truck frames are so well known this showing is considered adequate to a comprehensive understanding of the invention.

A brake mechanism embodying the invention is shown in the drawings associated with the truck frame 10 and wheels 16. The mechanism comprises a sleeve 20 encircling the axle 15 in concentric relation with wheel 16 and comprising an inner cylindrical portion 21 carried by an outer frustro-conical shaped portion 22. The portion 22 of the sleve 20 is rigidly secured to the inside face of the wheel 16 by bolts 23. The sleeve 20 is preferably made in two oppositely disposed, substantially semi-circular sections arranged in abutting relation and rigidly secured in such relation by the bolts 23 at one end and by bolts 24 at the opposite or inner end provided through lugs 25 extending from the two sections of the sleeve. By this construction the sleeve 20 may be applied around the axle 15 to the wheel 16 with the wheel mounted on the axle, as will be evident.

Each of a pair of rotatable friction braking elements 26 encircling the sleeve 20 is provided centrally with a relatively long bearing portion 27 slidably engaging the cylindrical portion 21 of sleeve 20, and each of said bearing portions supports an annular disc like braking portion 28 having opposite, radially arranged braking faces. An annular shoulder 29 is provided on the bearing portion 27 of each of the rotatable elements 26 at each of the opposite sides of the braking portion 28 for reasons to be later described. A fillet 30 is provided between each of the shoulders 29 and the braking portion 28 of the rotatable elements 26 for strengthening purposes.

The bearing portion 27 of each of the rotatable braking elements 26 is provided with one or more inwardly extending tongues or splines 31 disposed to slide in corresponding grooves provided in and extending longitudinally of the cylindrical portion 21 of sleeve 20. This spline connection between the rotatable braking elements 26 and sleeve 20 is provided for securing said elements to rotate with the wheel 16 and for permitting movement of said elements longitudinally of said sleeve.

Each of the rotatable braking elements 26 is made in two oppositely disposed substantially semi-circular sections to permit assembly thereof around the sleeve 20; each oppositely disposed pair of sections being rigidly secured together by bolts 32 provided through their abutting ends, as clearly shown in Figs. 2 and 5 of the drawings.

The rotatable braking elements 26 are adapted to move on the sleeve 20 from the position shown on Fig. 2 only in a direction away from each other, stop means, preferably in the form of one or more pins 33 projecting from the outer surface of the sleeve 20 being provided for engagement with the bearing portions 27 of said elements to prevent movement of said elements in the opposite direction. These pins 33 act to define the brake release position of the rotatable elements 26 which will be more clearly described later.

Each of the tongues 31 of the rotatable elements 26 is provided with a bore, the bore in the tongues in one element being aligned with the bores in the aligned tongues in the other element, and extending through each pair of these aligned bores and the slot in the sleeve between such bores is a brake release spring 34. Each of the springs 34 is provided at its opposite ends with loops through which there are provided pins 35 adapted to engage the opposite ends of the tongues 27 of the two rotatable elements. The springs 34 are secured to the rotatable elements 26 under tension and act to urge said elements to their brake release position engaging the pins 33.

A pair of oppositely disposed annular non-rotatable friction braking elements 36 are disposed between the two rotatable elements 26 for frictionally engaging the adjacent faces of said rotatable elements, while disposed adjacent the outer face of each of said rotatable elements is an annular non-rotatable friction braking element 37 for frictionally engaging the adjacent faces of said rotatable elements.

The non-rotatable braking elements 36 and 37 encircle the sleeve 20 and the adjacent annular shoulders 29 provided on the bearing portions 27 of the rotatable braking elements 26, and each of said non-rotatable elements is provided with a central opening of a greater diameter than that of said shoulders to permit movement of the non-rotatable elements relative to the rotatable elements 26 in a substantially vertical direction, for reasons which will be later described.

The non-rotatable braking elements 36 and 37 are each made in two oppositely disposed substantially semi-circular sections arranged in substantial abutting relation, but not connected together at their ends, and each of said sections is provided with a pair of spaced outstanding ears 38. The four ears 38 of each of the non-rotatable elements are preferably spaced substantially the same distance apart with the ears on all of the non-rotatable elements aligned and slidably mounted on four spaced support rods 39 arranged around but spaced from the peripheries of the rotatable braking elements 26, whereby said rotatable elements are free to turn in the space between said rods.

The four rods 39 are rigidly supported at their opposite ends in arms 40 of a pair of like spaced members 41, both of which members are pivotally supported at one end on a horizontally disposed torque rod 42 secured in spaced lugs 43 projecting from one side of the truck transom 12.

One of the arms 40 of each of the members 41 is disposed above the cylindrical portion 21 of sleeve 20 while the other arm is disposed below, while between each pair of said arms there is provided an opening having a radius substantially equal to that of the central opening through the non-rotatable elements 36 and 37.

The ends of the two arms 40 of each member 41 are connected together by a strut 44 rigidly secured to said arms by cap screws 45. The arms 40 tend to spread during braking, which will be later described, and in order to avoid subjecting the cap screws 45 to shearing stresses set up at such a time, a shear pin 45' is provided in each joint between the struts 43 and arms 40, as clearly shown in Fig. 7 of the drawings, to take such stresses. Each of the shear pins 45' is notched at one side, as shown in Fig. 1, to permit application of the cap screws 45 which extend through said notches and are adapted to hold the shear pins in place.

Each of the opposite ends of the bars 39 has a neat sliding fit in a suitable bore provided in the respective member 41, and at right angles to such bore another bore is provided open at one end to the edge of said member and aligned with a bore through the rod. Slidably mounted in each of these aligned bores is a pin 46 inserted from the edge of the member 40 and adapted to secure said member against movement longitudinally of the rod 39. The fit between the ends of the rods 39 and the bores in the members 41 is sufficiently tight to provide a rigid, cradle like structure embodying said rods and members, while the pins 46 are provided to hold the members 41 assembled on the rods 39 in a predetermined relation.

Each of the pins 46 has a head 47, and secured in the members 41 over each of the heads 47 is a cotter pin 49 for preventing the respective bolts 46 from accidentally working out of the respective rods 39 and members 41. In order to facilitate removal of pins 46 from the members 41 when the cotter pins 49 are removed, the head 47 of each bolt 46 is provided with a projecting portion 50 upon which a hammer may be used for driving the pin out of the member.

The inner end of each of the rods 39 extends beyond the outer face of the inner member 41 and is provided with a through bore 48 adapted to receive a bar for turning the rod in the members 41 when, with the pins 46 removed from said members, it is desired to remove said rods from said members.

From the above description it will be noted that rods 39 and members 41 constitute a rigid, cradle like structure for supporting the non-rotatable elements 36 and 37, and said elements are movable with said structure about the pivotal connection with rod 42 and relative to the sleeve 20 and rotatable elements 26, this relative movement being permitted due to the aligned central openings through the non-rotatable elements 36 and 37 and members 41 being of greater diameter than the annular shoulders 29 on the rotatable elements 26.

Projecting inwardly from the inner periphery of the top section of each of the non-rotatable elements 36 and 37 is an arcuate shaped shoe 54 formed on a radius substantially equal to that of the shoulders 29 and arranged to engage the adjacent shoulder 29 for limiting movement of the non-rotatable elements 36 and 37 in a direction clockwise about the torque rod 42 to a position in which said non-rotatable elements are in substantial concentric relation with the rotatable braking elements 26.

The non-rotatable elements 37 are disposed backed up against the frame members 41 and are held against movement out of such positions by pins 51 secured in suitable bores in the rods 39. It will be noted that the faces of the non-rotatable elements 37 engaging the members 41 are opposite the braking faces thereof and each of the struts 43 is provided between the arms 40 of members 41 with an inwardly extending portion 52 engaging and for thereby supporting during braking the portion of the non-rotatable elements 37 between the ends of the arms 40.

The braking faces of each of the non-rotatable elements 36 and 37, that is, the faces of said elements adjacent the adjacent faces of the rotatable elements 26, are provided throughout their length with a plurality of spaced, preferably radially arranged slots 53, the purpose of which will be later brought out.

An annular brake actuator 55 encircling the sleeve 20 between and in concentric relation with the non-rotatable elements 36 is provided with spaced arcuate shaped slots 56 through which the rods 39 extend for supporting said actuator. The slots 56 are provided for permitting the actuator to be turned from its brake release position shown in Fig. 3 of the drawings, in a clockwise direction relative to the non-rotatable elements 36 for applying the brakes on the vehicle, the slots being so arranged that upon movement in the opposite direction the actuator will move against the rods in said position for reasons to be later brought out. Pins 65 are provided in bars 39 each side of the actuator 55, as shown in Figs. 3 and 8 of the drawings, for holding the actuator against movement out of a position substantially midway between the non-rotatable elements 37, the actuator being rockable on rods 39 between said pins.

The actuator 55 is preferably made in two oppositely disposed, substantially semi-circular sections arranged in abutting relation and rigidly secured together by bolts 58 as shown in Fig. 3 in the drawings. By this arrangement the actuator, like other parts of the brake mechanism above described, is adapted to be assembled in position with the wheel 16 mounted on the axle 15, as will be evident.

The actuator 55 carries in each of its opposite faces four equally spaced rollers 59 journaled on radially arranged pins 60 suitably secured in the actuator, the rollers in one side of the actuator being preferably disposed opposite to those in the opposite side. The rollers 59 project slightly beyond the opposite faces of the actuator in each of which faces there is provided an annular recess 61 in line with the rollers.

Each of the non-rotatable elements 36 is provided on the face adjacent the rollers 57 with four equally spaced raised cam surfaces 62 arranged for engagement by said rollers. All of the cam surfaces 62 are identical and so arranged that upon turning of the actuator 55 relative to the non-rotatable elements 36 in a clockwise direction, as viewed in Figs. 3 and 4 of the drawings or in the direction toward the left hand as viewed in Fig. 10, each of the rollers 59 first contacts a relatively steep but short sloping portion 63 of the cam and then upon further movement a gradually sloping relatively long portion 64 of the cam. The annular recesses 61 are provided in the opposite faces of the actuator to receive the cams 62 in the brake release position thereof, as clearly shown in Fig. 10 of the drawings.

Each of the non-rotatable elements 36 is provided with a finger 66 projecting from each of the ears 38, and each oppositely disposed pair of fingers on the two elements 36 are connected together by a spring 67 which is under tension and therefore adapted to hold the non-rotatable elements 36 against the rollers 59.

The parts of the brake mechanism above described are shown in the drawings in their brake release position, it being noted that the rotatable braking elements 26 are engaging stop pins 33 thereby providing a clearance space between said elements and the non-rotatable elements 37. With the actuator 55 in its release position and the springs 67 holding the non-rotatable elements 36 against the rollers 59 clearance space is provided between said elements and the rotatable elements 26. The rotatable elements 26 are thus free to turn with the wheel 16 between the non-rotatable braking elements 36 and 37.

A brake cylinder device 68 disposed to one side of and with its axis slightly above and at right angles to that of the actuator 55 is rigidly mounted on a bracket 59 which is secured to one side of the transom 12. The brake cylinder device 68 is substantially the same as the conventional type employed on railway cars and comprises a casing having a through bore closed at one end by a pressure head 70 and at the opposite end by a non-pressure head 71.

A piston 72 is mounted to slide in the bore in the brake cylinder body and is provided with a hollow push rod 73 slidably extending through a suitable bore provided in the non-pressure head 71. The brake cylinder piston 72 has at one side a pressure chamber 74 connected to a pipe 75 through which fluid under pressure is adapted to be supplied to and released from said chamber for controlling the application and the release of the brakes on the vehicle truck. The piston 72 has at the opposite side a non-pressure chamber 76 which is open to the atmosphere in any suitable manner as by way of clearance space provided around the piston rod 73 in the bore through the end of the non-pressure head 71. A release spring 77 is provided in the non-pressure chamber 76 to act on piston 72 for urging it to its release position, shown in the drawings.

A push rod 78 is disposed in the hollow brake cylinder piston rod 73. The rod 78 is of smaller diameter than that of the bore in the push rod 73 and is provided at its inner end with a ball like enlargement 79 engaging the rear face of the piston. A ring 80 encircling the rod 78 in front of the ball like end 79 thereof is rigidly secured in the piston rod 73 for effecting movement of the push rod 78 with the piston 72. The push rod 78 extends beyond the outer end of the piston rod 73 and at its outer end is provided with a jaw pivotally connected through the medium of a pin 81 to an upstanding ear 82 projecting from the actuator 55. By this construction it will be noted that the release spring 77 acting on the brake cylinder piston 72 acts through the push rod 78 and ear 82 to turn the actuator 55 to its brake release position, shown in Fig. 3 of the drawings.

Each of the cradle members 41 is provided with an arm 83 projecting from the topmost portion of the member, and to the end of each of these arms is connected one end of a spring 84, the other ends of the two springs 84 being secured to a rod 85 which is mounted in lugs 86 provided on the non-pressure head 71 of the brake cylinder device.

Both of the springs 84 are tension springs and arranged to act on the arms 83 to turn the cradle members 41 and parts of the brake mechanism carried thereby in a counterclockwise direction about the torque rod 42. It will also be noted that when the actuator 55 is in the position engaging the rods 39, as shown in Fig. 3, the brake cylinder release spring 77 acts in conjunction with the springs 84 to turn the cradle members 41 in a counterclockwise direction as above described.

When the brakes are released and the pressure chamber 74 in the brake cylinder device 70 is therefore opened to the atmosphere, the combined pressures of the springs 84 and 77 are adapted to turn the members 41 and the parts of the brake mechanism carried thereby in a counterclockwise direction as above described and to an elevated position in which the shoes 54 formed inside of the non-rotatable elements 36 and 37 are raised away from the shoulders 29 on the rotatable brake elements 26, so as to thereby relieve the sleeve 20 and wheel 16 of the weight of said members and parts of the brake mechanism.

As will be noted, the counterclockwise movement of the non-rotatable elements 36 and 37 to their normal elevated position, above described, need only be sufficient to disengage the centralizing shoes 54 on said elements from the shoulders 29 on the rotatable elements 26. One feature of the invention is the provision of means for limiting such counterclockwise movement of the non-rotatable elements whereby, regardless of the vertical position of the truck frame which carries the non-rotatable elements, the shoes 54 on said elements in their elevated position will always be spaced from the shoulders 29 the same fixed distance. By this arrangement the central openings through the members 41 and non-rotatable elements 36 and 37 can be made smaller in diameter than if such movement were always to a fixed position with respect to the truck frame. These smaller central openings also permit obtaining a braking surface of desired area on braking elements of smaller diameter than could otherwise be obtained, which is also very desirable.

In order to thus define the elevated position of the non-rotatable elements 36 and 37 and centralizing shoes 54 associated therewith, each of the cradle members 41 is provided with an arm 87 in the end of which is a roller 88 adapted to engage a tapered surface 89 provided on an adjustable stop 90.

The stop 90 is disposed against one side of transom 12 and has a depending stem 91 guided in suitable U-brackets 92 secured to said transom. The lower end of stem 91 engages the truck equalizer bar 18, while interposed between the top of the stop 90 and any suitable portion of the truck frame, such as an arm 93 extending from the brake cylinder supporting bracket 59, is a spring 94 acting to urge the stop 90 and thereby the stem 91 in a downwardly direction for thereby maintaining said stop in a fixed vertical position relative to the equalizer bar 18. Movement of the transom 12 in a vertical direction, due to different degrees of load carried by the truck frame or due to vibration or the like, is therefore adapted to be relative to the stop 90, so that in the normal elevated or brake release position of the cradle members 41 and parts of the brake mechanism carried thereby, the rollers 88 will engage portions of the sloping surface 89 depending upon the vertical position of the sprung parts of the truck with respect to the equalizer bar 18 which is unsprung.

The stop 9 is thicker at the top than at the bottom so as to thereby provide the tapered surface 89, the slope of which varies according to the elevated or depressed positions of the truck frame with respect to the truck wheels or in other words according to the load on the truck. If the truck frame is in its empty and therefore most elevated position, the rollers 88 will engage the surface 89 adjacent the upper or thicker part of the stop and therefore limit the clockwise movement of the cradle members 41 and non-rotatable elements 36 and 37 to a less degree than when the truck frame is in its most depressed or fully loaded position, in which latter condition the rollers 88 will engage the surface 89 adjacent the bottom or thinner portion of the stop. In other words, the rollers 65 will engage a portion of the surface 89 depending upon the elevated or depressed position of the truck frame with respect to the truck wheels and thereby limit the counterclockwise movement of the members 41 to such a degree that the centralizing shoes 54 will in their elevated condition be spaced from the centralizing shoulders 29 a fixed distance which is sufficient to insure removal of the weight of the cradle members 41 and the parts of the brake mechanism carried thereby from the sleeve 20, when the brakes are released.

When the brakes are released and the rollers 88 are in engagement with the adjustable stop 90, the brake cylinder piston 72 will be spaced from the brake cylinder pressure head 70, the degree of such spacing depending upon the portion of cam 90 engaged by the rollers 88 and therefore varying according to the loaded or depressed condition of the truck frame. In other words, the clearance space in front of the brake cylinder piston, or the volume of the pressure chamber 74 will vary, with the piston 72 in its release position, according to the loaded condition of the truck, being greater when the truck frame is in its empty and therefore elevated position than when in its depressed or loaded condition. This is a very important feature in that it provides an automatic load control of brakes whereby the degree with which the brakes on the vehicle are applied will automatically be varied according to the degree of load carried by the truck, as will be more clearly described hereinafter.

*Installation and maintenance of the improved brake mechanism*

The above described brake mechanism may be installed and maintained or repaired on a truck without dismantling of the truck or of the wheel and axle assemblies with which the mechanism is associated, which is a very important and desirable feature. It is of course essential that the truck wheel 16 be provided with a mounting face for the end of sleeve 20 and with holes for bolts 23, and it is also essential that the transom 12 or other fixed part of the truck frame be arranged for mounting of the brake cylinder bracket 59, U-brackets 92 and be provided with the torque lugs 43 or their equivalent.

Assuming that the truck wheel 16 and transom 12 are in the condition just described, the brake cylinder bracket 59, brake cylinder device 68, adjustable stop 90 and brackets 92 may be mounted on the truck and then maintained as required, in an obvious manner. One method of mounting the other parts of the mechanism on the truck frame will now be described.

The two halves of the sleeve 20 are mounted over the axle 15, one from either side of the axle and positioned against the wheel 16. The bolts 23 are then placed in position and tightened securing the sleeve to the wheel. Bolts 24 are then inserted through lugs 25 at the inner ends of the sleeve sections and tightened thereby providing a rigid sleeve unit rigidly secured to wheel 16 and rotatable therewith.

The two rotatable brake elements 26, the sections of which may be previously secured together by bolts 32, are then slipped on to the sleeve 20; the release springs 34 are next applied to said elements and secured in position by the pins 35. These elements 26 are then moved apart to their release position and the stop pins 33 applied to the sleeve 20.

With the struts 44 removed from the ends of members 41, said members are next positioned at either side of the rotatable elements 26 with one of the arms 40 of said members disposed above the axle and the other below the axle. The torque rod 42 is next slipped into place through the lugs 43 and openings in the ends of the members 41 and then secured in position in any desired manner (not shown).

The actuator 55 is next applied, one half from either side of the axle and the two halves are rigidly secured together by bolts 58. The two top rods 39 are next inserted through their bores in the inside member 41 and as they are pushed toward the actuator 55 the upper halves of first the non-rotatable element 37 and then the non-rotatable element 36 are slipped into place and said rods are threaded through said elements, then through the slots 56 in the actuator, then through the upper halves of the other two non-rotatable elements 36 and 37 which are successively slipped into position, and finally said rods are slipped into the bores into the outside member 41. The lower rods 39 and lower halves of the two sets of non-rotatable elements 37 and 36 are next applied in a like manner. The bolts 46 are next applied through the members 41 and rods 39 for securely holding said members and the parts of the brake mechanism carried thereby in a substantially rigid predetermined relation. The cotter keys 49 are then applied to insure the bolts 46 remaining in position.

Next the pins 51 are applied to the rods 39 for holding the outside non-rotatable elements 37 backed up against the end members 41. The struts 44 are now secured to the ends of the arms 40 by cap screws 45, the shear pins 45' being positioned during this operation.

With the brake cylinder device 68 mounted on the truck, the rod 78 therein is connected to the ear 82 of the actuator 55 and the springs 84 applied. The mechanism is now ready to operate.

In case it is desired to renew the entire mechanism, it may be removed by reversing the above operations, but in case it is desired to renew only one or more or a part of one of the wear elements, such as the rotatable elements 26, non-rotatable elements 36 or 37, or actuator 55, such renewal can readily be made merely by pulling out two or all of the supporting rods 39; as required, sufficiently far to free the part or parts to be renewed.

The sleeve 20 should never have to be renewed due to wear since it is subject only to slight sliding action of the rotatable elements 26. The shoulders 29 on the rotatable elements take the centralizing thrust from the shoes 54 so that renewal of the braking elements 26, 36 and 37, will take care of wear due to the centralizing action, which will be more fully described later.

It will now be noted that installation and maintenance or repair of the improved mechanism is relatively simple and can be effected on an assembled truck by an ordinary workman and with ordinary tools such as found on all railroads.

Operation

The brake cylinder pipe 75 is adapted to be connected preferably to a triple valve device (not shown) such as employed on railway vehicles, or it may be connected to any other desirable means which is operative to supply fluid under pressure to said pipe to effect an application of the brakes and to release fluid under pressure from said pipe in order to effect the release of the brakes.

In the drawings the parts of the brake mechanism are shown in the condition they assume when the brakes are released. Let it be assumed that the wheel 16 and thereby the rotatable braking elements 26 are turning and that it is desired to retard or stop rotation thereof. In order to stop or retard rotation of wheel 16, or in other words effect an application of the brakes, fluid under pressure is supplied to the brake cylinder pipe 75 through which it flows to the brake cylinder piston chamber 74 and therein acts on the brake cylinder piston 72. The brake cylinder piston 72 is thereby moved towards the right hand and acts through the push rod 78 on the actuator 55, tending to turn said actuator on the rods 39 in a clockwise direction, as viewed in Figs. 1 and 3 of the drawings.

In the release position of the actuator 55, the oppositely disposed sets of rollers 59 are in engagement with the relatively short, steep portions 63 of the cams 62 provided on the non-rotatable elements 36, and these portions of the cams offer such resistance to movement of said rollers that the initial movement of the push rod 78 by the brake cylinder piston 72 acts to turn, as a unit, the actuator 55, non-rotatable elements 36 and 37, members 41 and other parts of the brake mechanism carried by said members in a clockwise direction about the torque rod 42. This movement in a clockwise direction continues until the centralizing shoes 54 on the non-rotatable elements 36 and 37 engage the annular shoulders 29 provided on the rotatable elements 26. This engagement between the centralizing shoes 54 and shoulders 29 then acts to prevent further clockwise movement, such as just described, after which the pressure applied by the brake cylinder piston 72 through the actuator 55 to the rollers 59, moves said rollers against the cam surfaces 63 with such force as to move said surfaces apart and thereby move the non-rotatable elements in a direction away from the actuator 55 and into engagement with the rotatable elements 26. The rotatable elements 26 are in turn then moved apart and into engagement with the non-rotatable elements 37.

The rollers 59 leave the relatively steep portions 63 of the cams 62 and roll on to the more gradual sloping portions 64 at the time or just before the rotatable elements 26 are moved into engagement with the non-rotatable elements 37, after which the pressure applied by the brake cylinder piston 72 to the rollers 59 acts through the portions 64 of the cams 62 to force the non-rotatable elements 36 and 37 into frictional braking engagement with the opposite faces of the rotatable elements 26 for retarding or stopping rotation of the rotatable elements 26 and thereby of the wheel 16.

The degree with which the rotatable elements 26 and thereby wheels 16 are retarded or braked as just described, depends upon the pressure of fluid supplied to chamber 74 to act on the brake cylinder piston 72 and may be varied in the usual manner to provide any desired degree of braking.

While the braking elements 36 and 37 are in frictional braking engagement with the rotatable braking elements 26, material torn or rubbed off the engaging frictional surfaces is adapted to be received in the slots 53 in the non-rotatable elements so as to thereby maintain a most intimate and efficient braking contact between said surfaces.

Upon movement of the vehicle truck along the track, air currents incident to such movement are adapted to circulate through all of the grooves 53. This flow of course will be most pronounced through the slots the outer ends of which are arranged to more or less directly scoop the air in from the atmosphere and such flow is adapted to dissipate heat from the braking elements incident to braking for thereby maintaining said elements at such a temperature as to provide efficient braking.

When an application of the brakes is effected as just described, it will be noted that the springs 84 act to oppose the pressure of fluid supplied for moving the piston 72 with a pressure which gradually increases only during movement of the non-rotatable elements 36 and 37 into concentric relation with the rotatable elements 26, after which said springs remain in a fixed pressure condition, that is, they do not act to further oppose movement of the brake cylinder piston 72, like the brake cylinder release spring 77, which acts with a constantly increasing force on said piston as said piston is moved to its full application position. This is very desirable in that a greater proportion of the fluid pressure supplied to act on the brake cylinder piston 72 is effective in applying the brakes, than if the tension of springs 84 were increased to oppose movement of said piston throughout its full travel, like the brake cylinder release spring 77. The brake cylinder release spring 77 is however a relatively light spring which is required only to draw the actuator from its application position back to its release position as will be later described, and therefore does not reduce the effectiveness of the fluid pressure supplied to act on the brake cylinder piston 72 to any greater extent than in conventional practice.

The release position of the brake cylinder piston 72 with respect to the pressure head 70 depends upon the loaded condition of the truck, said piston being relatively close to said pressure head when the truck is in its fully loaded, depressed condition, and spaced from said head a considerable distance when the truck is in its most elevated or empty position shown in the drawings and as hereinbefore described. The resultant variation in the volume of pressure chamber 74 acts automatically in effecting an application of brakes to provide a variation in the degree of braking of the truck according to the load carried thereby, it being noted that regardless of the loaded condition of the truck and therefore the normal position of the brake cylinder piston 72 in the cylinder 68, the degree of movement and therefore the displacement of said piston from its release position for applying the brakes is substantially the same.

It is well known that in fluid pressure brake equipment, such as the K-type employed on railroads, an application of the brakes is effected by a reduction in brake pipe pressure and the consequent operation of the triple valve device to supply a predetermined quantity of fluid under pressure, depending upon the degree of brake pipe reduction, from the auxiliary reservoir to the brake cylinder. The pressure obtained in the brake cylinder by this definite quantity of fluid under pressure then varies according to the volume of the pressure chamber in front of the brake cylinder piston, being higher when said chamber is relatively small than when the chamber is of greater volume.

With the brake cylinder piston chamber 74 in the present invention supplied with a predetermined quantity of fluid under pressure from an auxiliary reservoir as just described, obviously the pressure therein will depend upon the distance the piston 72 moves away from the pressure head 70 in applying the brakes and where said piston is normally spaced from said pressure head a greater distance when the truck is empty than when loaded, the pressure obtained in said chamber by the predetermined quantity of fluid under pressure supplied thereto will be lower when the truck is in empty condition than when in loaded condition. In other words, the pressure obtained in the brake cylinder to act on piston 72 by operation of a triple valve device or the like (not shown) will vary with the vertical position of the truck frame with respect to the truck wheels, or in other words, in accordance with the load carried by the truck frame, and this is a very desirable feature in that it automatically provides substantially the same retarding effect on the vehicle truck for all loaded conditions of the truck.

When it is desired to effect a release of the brakes after an application, fluid under pressure is vented from the brake cylinder pipe 75 and thereby from the brake cylinder pressure chamber 74, and when the pressure in said chamber is sufficiently reduced on the brake cylinder piston 72, the release spring 77 starts moving said piston and the actuator 55 towards their release position. This movement of the actuator 55 continues until the rods 39 engage the ends of the slots 56 and during such movement the rollers 59 are moved down the cams 62 on the non-rotatable elements 36 to their normal position. As the rollers 59 are thus operated to release pressure between the braking elements and are returned to their normal position, the springs 34 act to return the rotatable elements 26 to their normal position engaging the stop pins 33, following which, the springs 67 act to return the non-rotatable elements 36 to their normal position out of engagement with the rotatable elements 26.

After the actuator 55 is moved into engagement with the rods 39 the pressure of the brake cylinder release spring 77 becomes effective to act in conjunction with the springs 84 to turn as a unit the members 41 and the parts of the brake mechanism carried thereby in a counter-clockwise direction about the torque rod 42 to their normal position defined by engagement of the rollers 88 with the adjustable stop 90. As the members 41 and parts of the brake mechanism carried thereby are thus turned or rocked on the torque rod 42 it will be noted that the centralizing shoes 54 are lifted out of engagement with the shoulders 29 on the rotatable elements 26 thereby relieving the sleeve 21 of the weight of these parts of the mechanism.

Brake equipment employed on railway vehicles must all be adapted for control by hand from the usual hand wheel or lever provided on such vehicles. In the mechanism embodying the present invention a rod 95 is pivotally connected to the ear 82 projecting from the actuator 55 and this rod is adapted to be connected to the usual hand wheel or lever (not shown) on railway vehicles, whereby the actuator 55 may be operated by hand in the same manner as by the brake cylinder piston 72 for controlling the application and release of brakes on the vehicle.

It is desired to note that while the brake mechanism above described is relatively simple in construction and adapted to provide efficient braking of a vehicle wheel, it can be applied to and removed from a vehicle truck without dismantling of the truck in any way. Furthermore, the novel design permits the use of relatively small braking parts and provides for automatic variation of the degree of braking of the truck in accordance with the load carried on the truck.

While one illustrative embodiment of the invention has been described it is not the intention to limit its scope to that embodiment or otherwise than by the terms of the appended claims.

Having now described my invention, what I claim as new and desire to secure by Letters Patent, is:

1. A brake mechanism for a wheel and axle assembly of a railway vehicle truck having a truck frame resiliently supported on said assembly, said mechanism comprising an annular, rotatable friction braking element secured to rotate with said assembly independently of the axle thereof, an annular, non-rotatable friction braking element adapted to frictionally engage said rotatable element for effecting braking of said wheel, adjustable means for normally supporting said non-rotatable element for movement with said frame relative to said wheel, a brake cylinder device rigidly secured to said frame and connected to said non-rotatable element for moving said non-rotatable element into frictional braking engagement with said rotatable element, and means in the operating connection between said brake cylinder device and non-rotatable element operative by said brake cylinder device and independently of said axle for effecting movement of said non-rotatable element relative to said frame into concentric braking relation with said rotatable element.

2. A brake mechanism for a vehicle truck having a truck frame resiliently supported on truck wheels, said mechanism comprising an annular, rotatable friction braking element secured to rotate with one of said wheels, an annular, non-rotatable friction braking element adapted to frictionally engage said rotatable element for effecting braking of said wheel, adjustable means for normally supporting said non-rotatable element for movement with said frame relative to said wheel, a brake cylinder device rigidly secured to said frame in a position to operate at right angles to the axis of said braking elements, and means connecting said brake cylinder device to said non-rotatable element operative by said brake cylinder device to first move said non-rotatable element relative to said frame into concentric relation with said rotatable element and then into frictional braking engagement with said rotatable element.

3. A brake mechanism for a vehicle truck having a truck frame resiliently supported on truck wheels, said mechanism comprising an annular, rotatable friction braking element secured to rotate with one of said wheels, an annular, non-rotatable friction braking element adapted to frictionally engage said rotatable element for effecting braking of said wheel, a brake cylinder device rigidly secured to said frame and comprising a piston and a spring acting on said piston for moving said piston to release position, means including said spring operatively connected to said non-rotatable element for normally supporting said non-rotatable element for movement with said frame, said piston being adapted to be operated to move said non-rotatable element relative to said frame into concentric relation with said non-rotatable element and into frictional braking engagement therewith.

4. A brake mechanism for a wheel and axle assembly of a railway vehicle truck having a truck frame resiliently supported on said assembly, said mechanism comprising an annular, rotatable friction braking element secured to rotate with one of the wheels of said assembly, an annular, non-rotatable friction braking element adapted to frictionally engage said rotatable element for effecting braking of said wheel, a brake cylinder device rigidly secured to said frame and comprising a piston operatively connected to said non-rotatable element, spring means connected to said non-rotatable element for normally supporting said non-rotatable element for movement with said frame, and means in the operating connection between said brake cylinder piston and non-rotatable element operative by said piston independently of the axle of said assembly to move said non-rotatable element against said spring means relative to said frame into concentric braking relation with said rotatable element and then into frictional braking engagement therewith.

5. A brake mechanism for a vehicle truck having a truck frame resiliently supported on truck wheels, said mechanism comprising an annular, rotatable friction braking element secured to rotate with one of said wheels, an annular, non-rotatable friction braking element adapted to frictionally engage said rotatable element for effecting braking of said wheel, a brake cylinder device rigidly secured to said frame and comprising a piston operatively connected to said non-rotatable element, and a spring in said brake cylinder device acting on said piston urging it to its release position, spring means connected to said non-rotatable element and cooperative with said spring to normally support said non-rotatable element for movement with said frame, and means in the operating connection between said non-rotatable element and brake cylinder piston operative by said piston to effect movement of said non-rotatable element relative to said frame, against the opposing force of said spring means and spring, into concentric relation with said rotatable element and into frictional braking engagement with said rotatable element.

6. A brake mechanism for a vehicle truck having a truck frame resiliently supported on truck wheels, said mechanism comprising an annular, rotatable friction braking element secured to rotate with one of said wheels, an annular, non-rotatable friction braking element adapted to frictionally engage said rotatable element for effecting braking of said wheel, a rigid frame like structure carrying in one end said non-rotatable element and supported at the opposite end on said truck frame to rock in a substantially vertical direction relative to said frame, spring means connected to said non-rotatable element for normally supporting said non-rotatable element for movement with said frame, a brake cylinder device rigidly secured to said frame and arranged to operate in a direction at right angles to the axis of said elements, and means connecting said brake cylinder device to said non-rotatable element and operative by said brake cylinder device to move said non-rotatable element relative to said frame into concentric relation with said rotatable element and into frictional braking engagement with said rotatable element.

7. A brake mechanism for a vehicle truck having a truck frame resiliently supported on truck wheels, said mechanism comprising an annular, rotatable friction braking element secured to rotate with one of said wheels, an annular, non-rotatable friction braking element adapted to frictionally engage said rotatable element for effecting braking of said wheel, a rigid frame like structure carrying in one end said non-rotatable element and supported at the opposite end on said frame to rock in a substantially vertical direction relative to said frame, a brake cylinder device rigidly secured to said frame and arranged to operate at right angles to the axis of said element, spring means connecting said non-rotatable element to said brake cylinder device for normally supporting said non-rotatable element for movement with said frame, and means connecting said brake cylinder device to said non-rotatable element operative by said brake cylinder device to effect movement of said non-rotatable element relative to said frame into concentric relation with said rotatable element and into frictional braking engagement with said rotatable element.

8. A brake mechanism for a vehicle truck having a truck frame resiliently supported on truck wheels, said mechanism comprising an annular, rotatable friction braking element secured to rotate with one of said wheels, an annular, non-rotatable friction braking element adapted to frictionally engage said rotatable element for effecting braking of said wheel, a rigid frame like structure carrying in one end said non-rotatable element and supported at the opposite end on said frame to rock in a substantially vertical direction relative to said frame, a brake cylinder device rigidly secured to said frame above the pivotal connection between said structure and frame and arranged to operate in a substantially horizontal direction at right angles to the axis of said elements and above the periphery of said non-rotatable element, spring means connecting said non-rotatable element to said frame for normally supporting said non-rotatable element for movement with said frame, and means connecting said brake cylinder device to said non-rotatable element and operative by said brake cylinder device to first rock said structure relative to said frame for centralizing said non-rotatable element with said rotatable element and for then moving said non-rotatable element into frictional braking engagement with said rotatable element.

9. A brake mechanism for a vehicle truck having a truck frame resiliently supported on truck wheels, said mechanism comprising an annular rotatable friction braking element secured to rotate with one of said wheels, an annular non-rotatable friction braking element adapted to frictionally engage said rotatable element for braking said wheel, means for moving said non-rotatable element into frictional engagement with said rotatable element, and mechanism in the operating connection between said means and non-rotatable element so constructed and arranged as to provide an initial low leverage rapid movement connection for moving said non-rotatable element into substantial engagement with said rotatable element and to then provide a high leverage, slow movement connection for forcing said non-rotatable element into frictional braking engagement with said rotatable element.

10. A brake mechanism for a vehicle truck having a truck frame resiliently supported on truck wheels, said mechanism comprising an annular rotatable friction braking element secured to rotate with one of said wheels, an annular non-rotatable friction braking element adapted to frictionally engage said rotatable element for braking said wheel, cam means associated with said non-rotatable element, actuating means engaging said cam means and operative upon movement thereof to move said non-rotatable element relative to and into frictional braking engagement with said rotatable element, said cam means being so constructed that movement of said actuating means thereon effects rapid movement of said non-rotatable element into substantial engagement with said rotatable element and then increases the leverage between said actuating means and non-rotatable element, and means for operating said actuating means.

11. A brake mechanism for a vehicle truck having a truck frame resiliently supported on truck wheels, said mechanism comprising an annular rotatable friction braking element secured to rotate with one of said wheels, an annular non-rotatable friction braking element adapted to frictionally engage said rotatable element for braking said wheel, said non-rotatable element having on the face opposite the braking face an inclined cam surface provided at one end with a relatively steep, short portion which merges into a relatively long gradually sloping portion, an actuating element arranged to move on said cam surface and operative upon movement over said relatively steep, short portion to move said non-rotatable element into substantial braking engagement with said rotatable element and operative upon movement on said relatively long gradually sloping portion to force said non-rotatable element into frictional braking engagement with said rotatable element, and means operatively connected to said actuating element for controlling the operation thereof.

12. A brake mechanism for a vehicle truck having a truck frame resiliently supported on truck wheels, said mechanism comprising an annular rotatable friction braking element secured to rotate with one of said wheels, an annular non-rotatable friction braking element adapted to frictionally engage said rotatable element for braking said wheel, means for supporting said non-rotatable element in braking relation with said rotatable element and for holding said non-rotatable element against rotation, an annular actuating member journaled on said means in concentric relation with said non-rotatable element and operative upon turning for controlling movement of said non-rotatable element into and out of frictional engagement with said rotatable element, means providing an operating connection between said actuating member and non-rotatable element so constructed and arranged that movement of the actuating member in one direction effects initially a rapid movement of said non-rotatable element in the direction of said rotatable element until said non-rotatable element substantially engages said rotatable element, and then said means provides a relatively high leverage, slow movement connection between said actuator and non-rotatable element for forcing said non-rotatable element into frictional braking engagement with said rotatable element, and means for operating said actuating member.

13. A brake mechanism for a vehicle truck having a truck frame resiliently supported on truck wheels, said mechanism comprising an annular rotatable friction braking element secured to rotate with one of said wheels, an annular non-rotatable friction braking element adapted to frictionally engage said rotatable element for braking said wheel, mechanism carrying in one end said non-rotatable element and pivotally connected at a remote portion to said frame, means resiliently supporting said one end of said mechanism from said frame for movement therewith relative to said rotatable element, an actuator carried by said mechanism and rotatable relative to said non-rotatable member for moving said non-rotatable element into frictional engagement with said rotatable element, means carried by said frame operatively connected to said actuator for effecting movement of said mechanism and non-rotatable element relative to said frame into concentric relation with said rotatable element and for also effecting rotation of said actuator, and means operatively connecting said actuator and non-rotatable element so constructed and arranged as to prevent rotation of said actuator relative to said non-rotatable element upon operation of said means until after said non-rotatable element is in concentric relation with said rotatable element.

14. A brake mechanism for a vehicle truck having a truck frame resiliently supported on truck wheels, said mechanism comprising an annular rotatable friction braking element secured to rotate with one of said wheels, an annular non-rotatable friction braking element adapted to frictionally engage said rotatable element for braking said wheel, mechanism carrying in one end said non-rotatable element and pivotally connected at a remote portion to said frame, means resiliently supporting said one end of said mechanism from said frame for movement therewith relative to said rotatable element, an actuator carried by said mechanism and rotatable relative to said non-rotatable member for moving said non-rotatable element into frictional engagement with said rotatable element, means carried by said frame for operating said actuator, a cam connection between said non-rotatable element and actuator so constructed as to require a pressure for turning said actuator exceeding the supporting pressure of said resilient means whereby initial operation of the actuator operating means is adapted to turn said mechanism and non-rotatable element relative to said frame to a position in which said non-rotatable element is in concentric relation with said rotatable element, means for stopping movement of said non-rotatable element when said concentric relation is obtained and for thereby providing resistance to further movement exceeding the resistance to turning of said actuator whereby further operation of said means is operative to turn said actuator for moving said non-rotatable element into frictional braking engagement with said rotatable element.

15. A brake mechanism for a wheel of a vehicle truck comprising an annular rotatable friction braking element secured to rotate with said wheel, an annular non-rotatable friction braking element adapted to frictionally engage said rotatable element for effecting braking of said wheel, means for effecting frictional engagement between said elements, said non-rotatable element being in the form of two oppositely disposed, substantially semi-circular segments arranged with opposite ends in substantially abutting relation but not connected, a structure encircling said rotatable element and carried by said truck, and means associated with said structure supporting said segments in operative relation with each other and for engagement by said rotatable element.

16. A brake mechanism for a wheel of a vehicle truck comprising an annular rotatable friction braking element secured to rotate with said wheel, an annular non-rotatable friction braking element adapted to fricionally engage said rotatable element for effecting braking of said wheel, means for effecting frictional engagement between said elements, said non-rotatable element being in the form of two oppositely disposed, substantially semi-circular segments arranged with opposite ends in substantially abutting relation but not connected, a solid frame work encircling said rotatable element and comprising a plurality of spaced rods disposed parallel to the axes of said elements, said segments being slidably mounted on said rods in operative relation with each other and for engagement by said rotatable element.

17. A brake mechanism for a vehicle truck having a truck frame resiliently supported on truck wheels, said mechanism comprising an annular, rotatable friction braking element secured to one of said wheels for rotation therewith, an annular non-rotatable friction braking element adapted to frictionally engage said rotatable element when in concentric relation therewith for braking said wheel, resilient means for supporting said non-rotatable element for movement normally with said frame, means operative to move said non-rotatable element relative to said frame and radially of said rotatable element against the force of said resilient means, and means forming a part of both of said elements operative when said elements are in concentric relation to stop such radial movement.

18. A brake mechanism for a vehicle truck having a truck frame resiliently supported on truck wheels, said mechanism comprising an annular, rotatable friction braking element secured to one of said wheels for rotation therewith, an annular non-rotatable friction braking element adapted to frictionally engage said rotatable element when in concentric relation therewith for braking said wheel, resilient means for supporting said non-rotatable element for movement normally with said frame, means operative to move said non-rotatable element relative to said frame and radially of said rotatable element against the force of said resilient means, said rotatable element having an annular shoulder, and an arcuate shaped stop carried by said non-rotatable element adapted to engage said shoulder when said elements are in concentric relation for limiting such radial movement.

19. A brake mechanism for a vehicle truck having a truck frame resiliently supported on truck wheels, said mechanism comprising an annular, rotatable friction braking element secured to one of said wheels for rotation therewith, an annular non-rotatable friction braking element having a normal elevated position with respect to and in eccentric relation with said rotatable element and being movable therefrom in a substantially vertical direction into concentric relation with said rotatable element, means for supporting said non-rotatable element from said wheel when in said concentric relation, spring means operatively connected to said non-rotatable element for normally supporting same in said elevated position for movement with said frame, a brake cylinder piston carried by said frame, and means connecting said brake cylinder piston to said non-rotatable element operative upon movement of said piston by fluid under pressure to initially move said non-rotatable element from said elevated position into concentric relation with said rotatable element and then into frictional braking engagement therewith, and a release spring acting on said brake cylinder piston for opposing movement thereof by fluid under pressure and cooperative with said spring means for normally supporting said non-rotatable element in said elevated position.

20. A brake mechanism for a vehicle truck having a truck frame resiliently supported on truck wheels, said mechanism comprising an annular rotatable friction braking disc secured to one of said wheels for rotation therewith, an annular, non-rotatable friction braking disc for frictionally engaging said rotatable disc for braking said wheel, resilient means connecting said non-rotatable disc to said truck frame for normally supporting said non-rotatable disc for movement with said frame, centralizing means operative independently of said rotatable disc to move said non-rotatable disc relative to said frame into concentric braking relation with said rotatable disc, braking means for moving said non-rotatable disc into frictional braking engagement with said rotatable disc, and a brake cylinder device carried by said frame and operative by fluid under pressure to effect operation of first said centralizing means and then said braking means.

21. A brake mechanism for a vehicle truck having a truck frame resiliently supported on truck wheels and therefore capable of movement in a vertical direction relative to said wheels, said mechanism comprising an annular rotatable friction braking element secured to one of said wheels for rotation therewith, an annular non-rotatable friction braking element for frictionally engaging said rotatable element to effect braking of said wheel, said non-rotatable element having a braking position in concentric relation with said rotatable element and having a normal, elevated position in eccentric relation to said rotatable element and in which said elements are disengaged, means for defining said braking position, resilient means connected to said non-rotatable element for moving same from said braking position to said elevated position and for normally supporting same in said elevated position from said frame, and means adjusted in accordance with vertical movement of said frame with respect to said wheel for defining said elevated position, said means being so constructed and arranged that said elevated position with respect to said rotatable element is the same for all vertical positions of said frame with respect to said wheel.

22. A brake mechanism for a vehicle truck having a truck frame resiliently supported on truck wheels and therefore capable of movement in a vertical direction relative to said wheels, said mechanism comprising an annular rotatable friction braking element secured to one of said wheels for rotation therewith, an annular non-rotatable friction braking element for frictionally engaging said rotatable element to effect braking of said wheel, said non-rotatable element having a braking position in concentric relation with said rotatable element and having a normal, elevated position in eccentric relation to said rotatable element and in which said elements are disengaged, means for defining said braking position, resilient means connected to said non-rotatable element for moving same from said braking position to said elevated position and for normally supporting same in said elevated position from said frame, stop means having a fixed vertical position with respect to said wheel, and means associated with said non-rotatable element and movable with said frame relative to and cooperative with said stop means to define said elevated position, the last named means and said stop means being so constructed and arranged that the eccentricity between said braking elements in the elevated position of said non-rotatable element is the same for all vertical positions of said truck frame with respect to said wheel.

23. A brake mechanism for a vehicle truck having a truck frame resiliently supported on truck wheels and therefore capable of movement in a vertical direction relative to said wheels, said mechanism comprising an annular rotatable friction braking element secured to one of said wheels for rotation therewith, an annular non-rotatable friction braking element for frictionally engaging said rotatable element to effect braking of said wheel, said non-rotatable element having a braking position in concentric relation with said rotatable element and having a normal, elevated position in eccentric relation to said rotatable element and in which said elements are disengaged, means for defining said braking position, resilient means connected to said non-rotatable element for moving same from said braking position to said elevated position and for normally supporting same in said elevated position from said frame, and means for defining said elevated position comprising a member having a sloping surface and means adjustable to engage various portions of said surface according to the vertical position of the truck frame with respect to said wheel, the slope of said surface being so arranged that in said elevated position the non-rotatable element is in the same eccentric relation to said rotatable element in all vertical positions of said truck frame relative to said wheel.

24. A brake mechanism for a vehicle truck having a truck frame resiliently supported on truck wheels and therefore capable of movement in a vertical direction relative to said wheels, said mechanism comprising an annular rotatable friction braking element secured to one of said wheels for rotation therewith, an annular non-rotatable friction braking element for frictionally engaging said rotatable element to effect braking of said wheel, means connected to said non-rotatable element adapted to be operated by fluid under pressure for effecting movement of said non-rotatable element into frictional braking engagement with said rotatable element, and mechanism adjusted in accordance with the vertical position of said truck frame with respect to said wheel for varying the pressure of the fluid supplied to act on said means in accordance with said vertical position.

25. A brake mechanism for a vehicle truck having a truck frame resiliently supported on truck wheels and therefore capable of movement in a vertical direction relative to said wheels, said mechanism comprising an annular rotatable friction braking element secured to one of said wheels for rotation therewith, an annular non-rotatable friction braking element for frictionally engaging said rotatable element to effect braking of said wheel, a brake cylinder device secured to said frame and comprising a casing, a piston disposed to reciprocate in said casing and connected to said non-rotatable element, said piston having at one side a pressure chamber to which fluid under pressure is adapted to be supplied for operating said piston to effect operation of said non-rotatable element to brake said rotatable element, and mechanism adjusted in accordance with the vertical position of said truck frame with respect to said wheel for varying the volume of said chamber in accordance with said vertical position.

26. A brake mechanism for a vehicle truck having a truck frame resiliently supported on truck wheels, said mechanism comprising an annular, rotatable friction braking element secured to one of said wheels for rotation therewith, an annular, non-rotatable friction braking element adapted when in concentric relation with said rotatable element to be moved into frictional engagement therewith for braking said wheel, a frame like structure carrying said non-rotatable element in one end and having the opposite end pivotally supported from said truck frame whereby said structure is rockable relative to said rotatable element to move said non-rotatable element into and out of concentric relation with said rotatable element, spring means operative to normally support said non-rotatable element and the adjacent portion of said structure from said truck frame in an elevated position above said concentric position, a cylinder device secured to said truck frame and adapted to be operated by fluid under pressure to rock said non-rotatable element and the adjacent portion of said structure from said elevated position into concentric relation with said rotatable element, and means for stopping the rocking of said non-rotatable element when said concentric relation is obtained.

27. A brake mechanism for a vehicle truck having a truck frame resiliently supported on truck wheels, said mechanism comprising an annular, rotatable friction braking element secured to one of said wheels for rotation therewith, an annular, non-rotatable friction braking element adapted when in concentric relation with said rotatable element to be moved into frictional engagement therewith for braking said wheel, a frame like structure carrying said non-rotatable element in one end and having the opposite end pivotally supported from said truck frame whereby said structure is rockable relative to said rotatable element to move said non-rotatable element into and out of concentric relation with said rotatable element, spring means operative to normally support said non-rotatable element and the adjacent portion of said structure from said truck frame in an elevated position above said concentric position, a cylinder device secured to said truck frame and having a fluid pressure operative piston arranged to move horizontally in a direction at right angles to and at one side of the axis of said non-rotatable element, and means connecting said piston to said non-rotatable element, said piston being operative by fluid under pressure to rock said non-rotatable element and the adjacent portion of said structure from said elevated position into concentric relation with said rotatable element, and means for stopping the rocking of said non-rotatable element when said concentric relation is obtained.

28. A brake mechanism for a vehicle truck having a truck frame resiliently supported on wheels, said mechanism comprising an annular rotatable friction braking element and an annular non-rotatable friction braking element adapted to frictionally interengage with each other to brake at least one of said wheels, the rotatable element being secured to a wheel of the truck and the non-rotatable element being supported from said truck frame, said elements being normally in eccentric relation, and in concentric relation when in frictional engagement, and means cooperating with the truck frame and a fixed part of said truck to maintain the same eccentric relation between said elements when said elements are disengaged from each other regardless of vertical movement of the truck frame relative to said wheels.

BURTON S. AIKMAN.